United States Patent
Shin

(10) Patent No.: US 7,566,073 B2
(45) Date of Patent: Jul. 28, 2009

(54) AIRBAG APPARATUS FOR VEHICLE

(75) Inventor: Dal Soo Shin, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 215 days.

(21) Appl. No.: 11/726,116

(22) Filed: Mar. 21, 2007

(65) Prior Publication Data

US 2008/0136150 A1    Jun. 12, 2008

(30) Foreign Application Priority Data

Dec. 7, 2006    (KR)    ............ 10-2006-0124141

(51) Int. Cl.
*B60R 21/01* (2006.01)

(52) U.S. Cl. .............. 280/735; 701/45; 297/250.1; 180/273

(58) Field of Classification Search ........... 280/735, 280/734; 701/45; 297/216.1, 250.1; 180/273
See application file for complete search history.

(56) References Cited

U.S. PATENT DOCUMENTS

| | | | |
|---|---|---|---|
| 5,468,014 A | | 11/1995 | Gimbel et al. |
| 5,690,356 A | * | 11/1997 | Lane, Jr. ............ 280/735 |
| 5,882,035 A | | 3/1999 | Munro |
| 6,007,093 A | * | 12/1999 | Bechtle et al. ........ 280/735 |
| 6,561,543 B1 | * | 5/2003 | Hamada et al. ....... 280/735 |
| 6,831,537 B2 | * | 12/2004 | Haas et al. ........... 335/207 |
| 6,846,012 B2 | * | 1/2005 | Baskin et al. ........ 280/735 |
| 6,903,286 B2 | * | 6/2005 | Kaijala et al. ........ 200/85 A |
| 7,021,709 B2 | * | 4/2006 | Dolan et al. ......... 297/253 |
| 7,159,686 B2 | * | 1/2007 | Martinez et al. ...... 180/286 |
| 7,168,738 B2 | * | 1/2007 | Garcia et al. ......... 280/735 |
| 2005/0082103 A1 | | 4/2005 | Garcia, Jr. et al. |
| 2005/0189805 A1 | * | 9/2005 | Burley et al. ........ 297/250.1 |

FOREIGN PATENT DOCUMENTS

| | | |
|---|---|---|
| DE | 44 26 677 A1 * | 2/1995 |
| JP | 11-198695 | 7/1999 |
| JP | 2000-326818 | 11/2000 |
| JP | 2004-050920 | 2/2004 |
| KR | 1998-0008853 | 4/1998 |
| KR | 2002-0065558 | 8/2002 |

* cited by examiner

*Primary Examiner*—Ruth Ilan
(74) *Attorney, Agent, or Firm*—Morgan, Lewis & Bockius LLP

(57) ABSTRACT

An airbag control system for a vehicle includes: a switch, configured to be coupled to a projection on a child safety seat when the child safety seat is mounted to a vehicle seat; a tether anchor on the vehicle seat, including a contact member and a tether anchor bar configured to be coupled to a hook connected to the child safety seat, and to be electrically connected to the contact member when the tether anchor bar is not coupled to the hook; and a controller, electrically connected to the switch and the contact member. If the child safety seat is mounted to the vehicle seat and/or the tether anchor bar is coupled to the hook, the controller receives a signal from the switch and/or the tether anchor bar and instructs an airbag module not to deploy.

6 Claims, 2 Drawing Sheets

AIRBAG APPARATUS FOR VEHICLE

CROSS-REFERENCE TO RELATED APPLICATION

This application claims priority to, and the benefit of, Korean Patent Application No. 10-2006-0124141, filed in the Korean Intellectual Property Office on Dec. 7, 2006, the entire contents of which are incorporated herein by reference.

BACKGROUND OF THE INVENTION (a) Field of the Invention

The present invention relates to an airbag control system for a vehicle that does not deploy the airbag if a car seat is present.

(b) Description of the Related Art

Typically, an airbag deploys regardless of whether a seat is occupied by an infant or a child. This may cause the infant or child to be injured.

SUMMARY OF THE INVENTION

The present invention provides an airbag control system that prevents an infant or a child from being injured by deployment of an airbag in a vehicle crash.

An exemplary embodiment of the present invention provides an airbag control system for a vehicle including: a switch, configured to be coupled to a projection on a child safety seat when the child safety seat is mounted to a vehicle seat; a tether anchor on the vehicle seat, including a contact member and a tether anchor bar configured to be coupled to a hook connected to the child safety seat, and to be electrically connected to the contact member when the tether anchor bar is not coupled to the hook; and a controller, electrically connected to the switch and the contact member. If the child safety seat is mounted to the vehicle seat and/or the tether anchor bar is coupled to the hook, the controller receives a signal from the switch and/or the tether anchor bar and instructs an airbag module not to deploy.

The switch may be a push-button switch. The tether anchor may also include a housing including a slot. The tether anchor bar is disposed in the slot. A spring may also be provided in the slot, which biases the tether anchor bar in a direction opposite the hook. The switch and the contact member may be connected to each other in parallel.

DETAILED DESCRIPTION OF THE PREFERRED EMBODIMENTS

Figure 1:
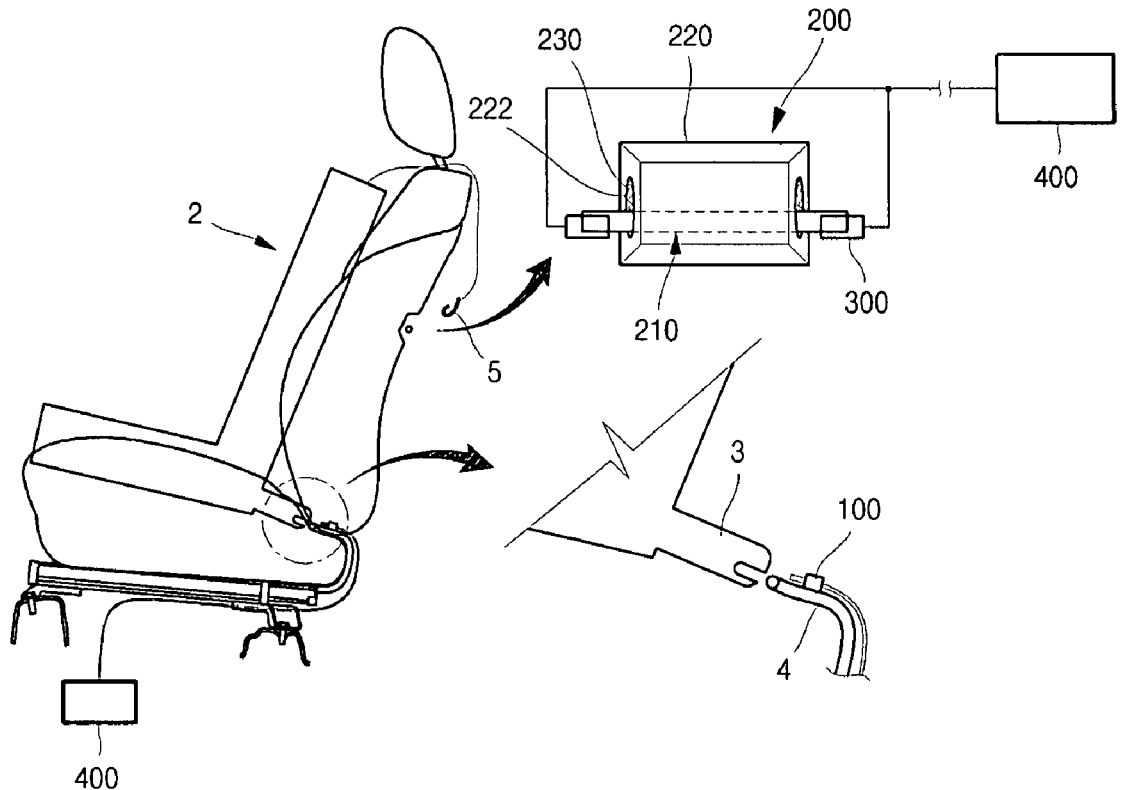
FIG. 1 is a side view of an airbag control system for a vehicle according to an exemplary embodiment of the present invention.

An exemplary embodiment of the present invention will hereinafter be described in detail with reference to the accompanying drawings.

An airbag control system according to an exemplary embodiment of the present invention includes a switch 100 coupled to an outer surface of a fixing anchor 4, which is coupled to a projection 3 of a child safety seat 2 when the child safety seat 2 is mounted to a vehicle seat. The switch 100 is turned off when it is coupled to the projection 3. In this state, it transmits a signal to an airbag module. A tether anchor 200 is provided at a rear side of a seat back and is connected to a hook 5 attached to the child safety seat 2. Contact members 300 are disposed on both sides of a tether anchor bar 210 and contact the tether anchor bar 210 to transmit a signal to the airbag module. A controller 400 receives signals from the switch 100 and the contact members 300 to instruct the airbag not to deploy if an infant or child occupies the child safety seat 2.

The switch 100 may be a push button switch which operates to be turned on and off, but may alternatively be any other switch that operates similarly.

The switch 100 and the contact member 300 may be connected to one another in parallel.

The tether anchor 200 includes an anchor housing 220. Slots 222 are provided at each side of the anchor housing 200 so that the tether anchor bar 210 can be inserted thereinto. An elastic member 230 is disposed in each slot 222. The elastic member 230 presses down on the tether anchor bar 210 before the hook 5 is coupled to the tether anchor bar 210, and is compressed by the tether anchor bar 210 when the tether anchor bar 210 is coupled to, and pulled upward by, the hook 5.

The elastic members 230 may each be a spring, one end of which is attached to an inner upper part of the slot 222, and the other end of which contacts an outer surface of the tether anchor bar 210.

If at least one of signals of the switch 100 and the contact member 300 is input to the controller 400, the controller 400 instructs the airbag module not to deploy.

The controller 400 may include a processor, memory, and associated hardware, software, and/or firmware as may be selected and programmed by a person of ordinary skill in the art based on the teachings herein.

Operation of an airbag control system according to the above-described exemplary embodiment of the present invention will now be explained.

Figure 2A:
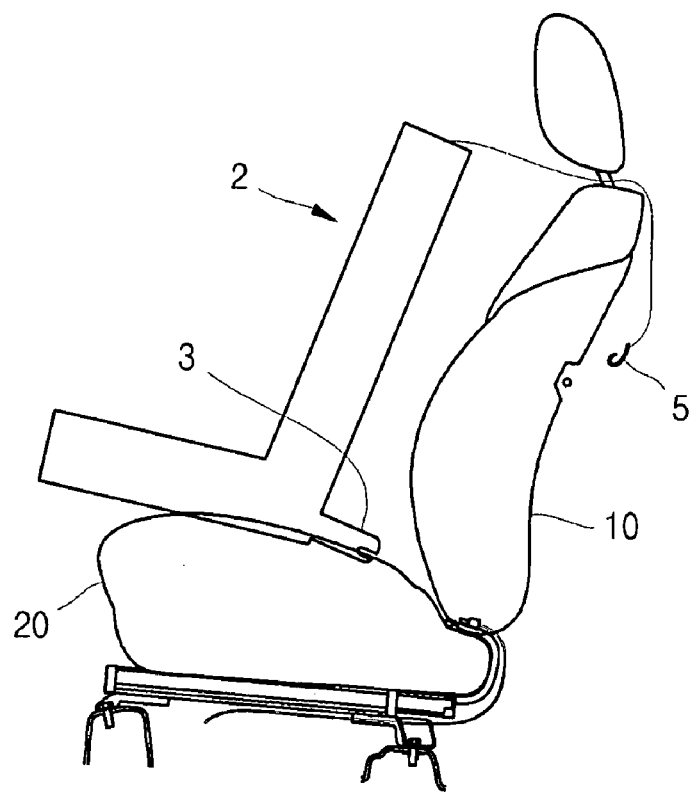
FIG. 2A to FIG. 2C illustrate the operation of the system of FIG. 1.

Referring to FIG. 2A, in order to mount the child safety seat 2 to a front passenger seat or a rear seat of a vehicle, the projection 3 is inserted into a junction between a seat back 10 and a seat base 20.

Figure 2B:
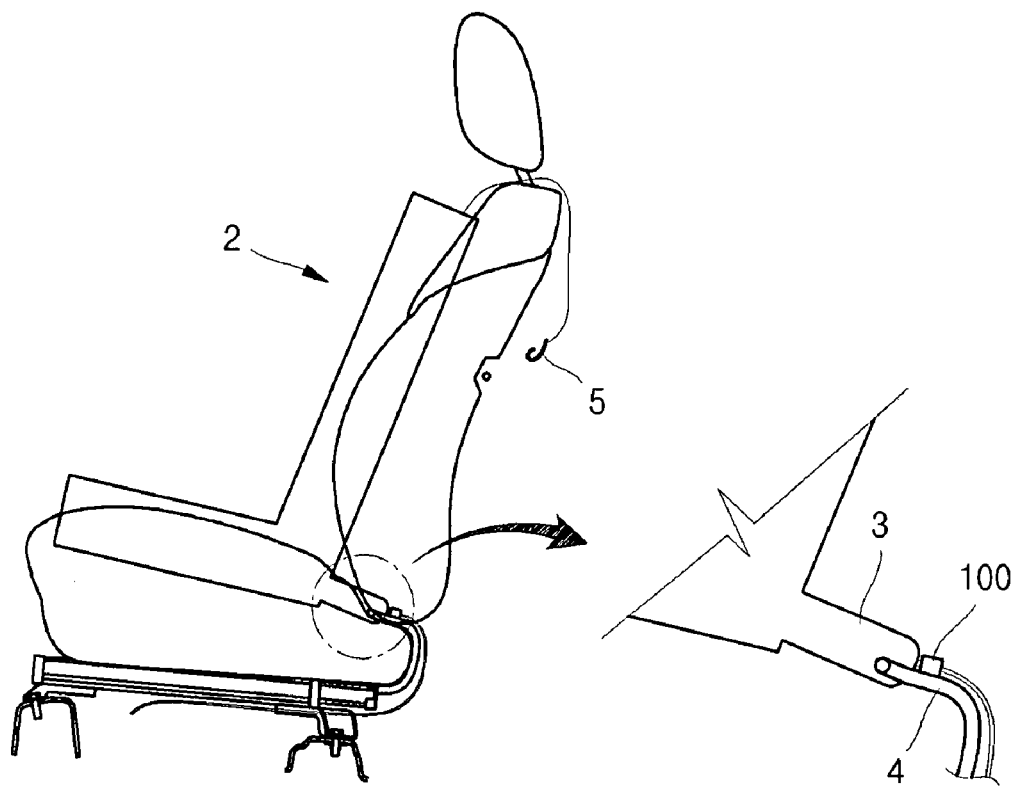

Referring to FIG. 2B, with the coupling of the fixing anchor 4 to the projection 3 of the child safety seat 2, the switch 100 is pressed by the projection 3. When the switch 100 is pressed, it transmits an "off" signal to the controller 400.

The tether anchor bar 210 is elastically supported in a downward direction by the elastic members 230 so as to contact the contact members 300. The tether anchor bar 210 may have a circular cross-section. The contact point provided to the contact member 300 may be plate-shaped. When contact occurs between the tether anchor bar 210 and the contact member 300, the controller 400 controls the airbag to be operable.

Figure 2C:
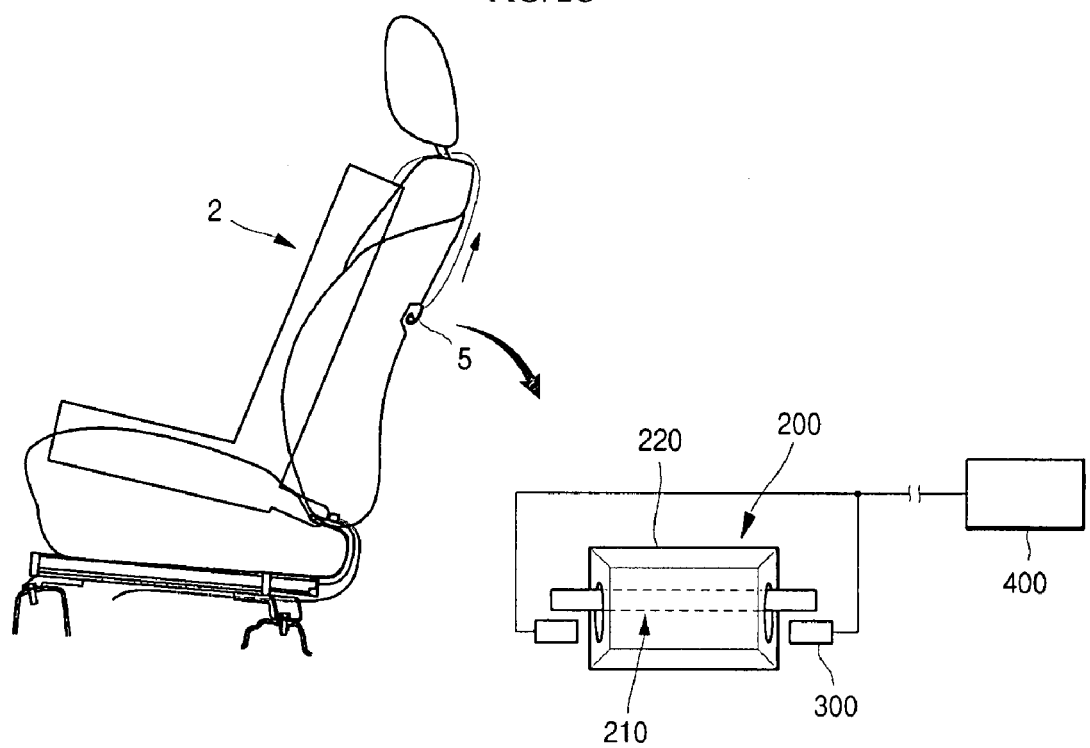

Referring to FIG. 2C, once the fixing anchor 4 is coupled as shown in FIG. 2B, the hook 5 is coupled to the tether anchor bar 210 of the tether anchor 200. The hook 5 pulls the tether anchor bar 210 upwards along the slot 222, separating the tether anchor bar 210 from the contact member 300, and an "off" signal is transmitted to the controller 400.

If the controller 400 does not receive a signal from one or both of the switch 100 and the contact member 300, the controller 400 does not signal an inflator (not shown) to operate the airbag.

As described above, an airbag control system for a vehicle according to the present invention detects whether a child safety seat has been mounted and controls the airbag not to operate if a child safety seat has been mounted, thus preventing an infant or child from being injured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An airbag control system, comprising:
   a switch, configured to be coupled to a projection on a child safety seat when the child safety seat is mounted to a vehicle seat;
   a tether anchor on the vehicle seat, comprising a contact member and a tether anchor bar configured to be coupled to a hook connected to the child safety seat, and to be electrically connected to the contact member when the tether anchor bar is not coupled to the hook; and
   a controller, electrically connected to the switch and the contact member, wherein if the child safety seat is mounted to the vehicle seat and the tether anchor bar is coupled to the hook, the controller receives a signal such that the controller instructs an airbag module not to deploy.

2. The system of claim 1, wherein if the child safety seat is mounted to the vehicle seat or the tether anchor bar is coupled to the hook, the controller further receives the signal such that the controller instructs the airbag module not to deploy.

3. The system of claim 1, wherein the switch and the contact member are connected to each other in parallel.

4. The system of claim 1, wherein the switch is a push-button switch.

5. The system of claim 1, wherein the tether anchor further comprises:
   a housing comprising a slot, wherein the tether anchor bar is disposed in the slot; and
   an elastic member disposed in the slot, which biases the tether anchor bar in a direction opposite the hook.

6. The system of claim 5, wherein the elastic member comprises a spring.

* * * * *